United States Patent
Adams

(10) Patent No.: US 8,066,807 B2
(45) Date of Patent: Nov. 29, 2011

(54) FIRE-RESISTANT AND INSULATING ADDITIVES FOR BUILDING MATERIALS, THEIR METHODS OF PRODUCTION AND USES THEREOF

(76) Inventor: Daniel Adams, North Hills, CA (US)

(*) Notice: Subject to any disclaimer, the term of this patent is extended or adjusted under 35 U.S.C. 154(b) by 0 days.

(21) Appl. No.: 12/493,024

(22) Filed: Jun. 26, 2009

(65) Prior Publication Data

US 2009/0320717 A1    Dec. 31, 2009

Related U.S. Application Data

(60) Provisional application No. 61/076,080, filed on Jun. 26, 2008.

(51) Int. Cl.
  *C09D 5/18* (2006.01)
  *C09K 21/02* (2006.01)
  *C04B 103/63* (2006.01)
  *C04B 111/28* (2006.01)

(52) U.S. Cl. .......... 106/18.12; 106/18.11; 106/18.13; 106/788; 106/815; 252/601; 428/920; 428/921

(58) Field of Classification Search ............ 106/18.11, 106/18.12, 18.13, 788, 628, 815; 252/601, 252/607; 428/920, 921
See application file for complete search history.

(56) References Cited

U.S. PATENT DOCUMENTS

| | | | |
|---|---|---|---|
| 1,792,826 A * | 2/1931 | Dugas | 252/7 |
| 2,074,938 A * | 3/1937 | Reed | 252/6 |
| 3,033,291 A * | 5/1962 | Wieslander | 169/47 |
| 4,095,985 A | 6/1978 | Brown | |
| 4,168,175 A | 9/1979 | Shutt | |
| 4,218,502 A | 8/1980 | Graham et al. | |
| 4,515,633 A | 5/1985 | Cruz, Jr. | |
| 4,756,839 A * | 7/1988 | Curzon et al. | 252/2 |
| 5,112,533 A | 5/1992 | Pope et al. | |
| 5,480,587 A | 1/1996 | Musselman et al. | |
| 5,948,323 A | 9/1999 | McLaughlin et al. | |
| 2003/0170317 A1 * | 9/2003 | Curzon et al. | 424/657 |
| 2007/0051271 A1 * | 3/2007 | Kruse et al. | 106/15.05 |

FOREIGN PATENT DOCUMENTS

| | | | |
|---|---|---|---|
| EP | 0 285721 A * | 10/1988 | |
| JP | 2007-238368 A * | 9/2007 | |
| WO | WO99/11327 A2 * | 3/1999 | |
| WO | WO2006/070960 A1 * | 7/2006 | |

OTHER PUBLICATIONS

Derwent Acc: No. 2007-057772, abstract of Chinese Patent Specification No. CN 1733641 (Feb. 2006).*

* cited by examiner

*Primary Examiner* — Anthony J Green
(74) *Attorney, Agent, or Firm* — Sandra Poteat Thompson; Buchalter Nemer

(57) ABSTRACT

Flame-retarding additives that may also have insulating properties are disclosed that include at least one carbonate salt, and at least one additional salt, active ingredient or combination thereof. In addition, methods of forming flame-retarding additives are disclosed that include providing at least one carbonate salt, providing at least one additional salt, active ingredient or combination thereof; and combining the at least one carbonate salt along with the at least one additional salt, active ingredient or combination thereof to form the flame-retarding additive. Flame-retarding additives disclosed may also comprise at least one filler material, including sand or white sand. These additives may also be included in paints and a number of processed building materials.

2 Claims, No Drawings

FIRE-RESISTANT AND INSULATING ADDITIVES FOR BUILDING MATERIALS, THEIR METHODS OF PRODUCTION AND USES THEREOF

This Application is a United States Utility Application that claims priority to U.S. Provisional Application Ser. No. 61/076,080 filed on Jun. 26, 2008, which is commonly-owned and incorporated herein in its entirety by reference.

FIELD OF THE SUBJECT MATTER

The field of the subject matter is fire-resistant and insulating additives for incorporation into various building materials, the methods of production of these additives and materials and their uses.

BACKGROUND

Many of the conventional building materials, including wood, wood composites, siding, glass, roofing, paint, insulation, flooring, foam insulation and related materials can be either flammable or present hazardous risks when in contact with extreme heat and/or fire. In addition, many of these materials are not designed to provide the high degree of insulative properties that are now in demand among consumers, as energy prices increase and temperatures fluctuate. For example, building materials used in most structures such as dwellings, commercial facilities and storage facilities include fabrication components such as wood, wood products, plastics, other synthetic materials and socalled composite materials. In addition, many of these man-made materials such as plastics, synthetics and composite materials utilize binder materials which are highly volatile when heated and which are highly flammable and, in some instances, actually explosive in character.

As a result of the pervasive and continuing use of flammable or combustible materials in construction, consumers have recognized and imperative need for protective materials which attempt to either render such materials to be flame or fire resistant or to provide a substantial improvement in heat insulation and resistive character. In addition, in high-fire risk areas and warmer climates, improved building materials that can not only resist attack by fire, but also insulate the enclosed spaces would be welcome.

U.S. Pat. No. 4,095,985 issued to Brown discloses thermal barrier compositions in which a composition is particularly adapted for coating structural surfaces to provide them with a thermal carrier to protect them from the detrimental effects of fire comprises an aqueous mixture of (a) lithium mica, (b) wollastonite, (c) aluminum trihydrate, (d) nepheline syenite, and (e) soda bicarbonate. The composition may be diluted with water to facilitate application. The composition may also contain raw vermiculite, sodium aluminum sulfate, borax, calcium sulfate, sodium silicate and other additives to improve the fireproofing, insulation and/or structural strength properties of the material.

U.S. Pat. No. 5,112,533 issued to Pope et al. discloses fire suppression compositions, which are produced by reaction of lignosulfonates with carbonate of soda to produce low-cost chemical reagents useful for fighting fires in progress or for treating flammable materials to render them non-flammable. Methods for producing the fire retardant compositions in liquid, foam or adhesive form are also disclosed.

U.S. Pat. No. 4,168,175 issued to Shutt discloses fire retardant compositions, which are generally non-caking compositions of intimately intermixed ammonium phosphate, e.g. mono and/or diammonium phosphate; sodium tetraborate containing molecularly bound water, e.g. the decahydrate, borax; and fractured finely ground solid powder particles of soda-containing silicate glass which have a high and irregular surface area and an active dry moisture absorbent surface condition for maintaining the particles of ammonium phosphate and sodium tetraborate in moisture protected disposition and for inhibiting the tendency of such particles to adhere to one another.

U.S. Pat. No. 4,515,633 issued to Cruz. Jr discloses polymeric materials combined with modified hydrated magnesium aluminosilicates, where the aluminosilicates are treated with aqueous acidic solutions and subjected to controlled agitation to convert highly porous concertina-shaped granular hydrated magnesium aluminosilicates into groups of electrolyte insensitive platelets. Water slurries of the groups of platelets when dried to form coherent, continuous sheets which when mechanically disintegrated may be reslurried in water. The modified heat exfoliated magnesium aluminosilicates are adapted for use in fire retardant, loose fill cellulose insulation, paper and pulp products, synthetic polymeric materials, coatings such as fire retardant acoustic coatings, dog foods, defoliants and the like.

U.S. Pat. No. 4,218,502 issued to Graham et al. discloses fire retardant products, such as asphalt roofing material, made fire-retardant by inclusion of a layer of intumescable hydrate soluble silicate particles. Preferred soluble silicate particles carry a protective moisture-resistant coating which increases the life of the roofing material, and also makes possible convenient manufacture of the particles. The protective coating includes a metal cation capable of reacting with the silicate ion of the core particle to form a reaction product that is less soluble than the core particle. The reaction is believed to seal any openings in the protective coating, thereby lengthening the effective life of the coating. Besides utility in roofing materials, the coated particles are useful as fire-retardant additives in many other products, including polymeric articles, sheet materials, coating compositions, etc, U.S. Pat. No. 5,480,587 issued to Musselman et al. discloses materials that may be used as fire retardant additives that includes a discussion of a method of modifying an inorganic material which evolves gases and/or vapors at a temperature which is detrimental to the processing the temperature of polymer or paper systems, so that the modified material can be used as a fire retardant additive with that polymer or paper system. The method comprises the steps of: (1) providing a first material; (2) treating the first material to remove the portion which involves gas which is detrimental to the processing of the polymer or paper system; and (3) combining a second material with the first material to create a modified material which does not evolve gas at a temperature which is detrimental to the processing of the paper or polymer system.

U.S. Pat. Nos. 5,695,691 and 5,948,323 issued to McLaughlin et al. discloses flame retardants and smoke suppressing compounds, along with the methods of manufacturing them, which includes compounds that provide flame retardancy and/or smoke suppressant properties to fibers, textiles, polymeric articles, paper, paint, coating and insulation. More particularly, these compounds include colloidal-sized particles of hydrated salts, organic phosphates, metal borates, polyamides, solid halogenated flame retardants with a melting point greater than 250° C., molybdenum compounds, metallocenes, antimony compounds, zinc compounds, bismuth compounds and other solid chemicals which act as flame retardants or smoke suppressants.

Although there appear to be about as many patents and patent applications related to fire retardant compositions and additives as there are chemicals in the Merck Index, one thing is clear when reviewing the conventional art related to fire retardants and insulation materials—there is no one additive that is a) simple to manufacture, b) simple in its list of components, c) easily incorporatable into and onto a number of building materials, and d) able to function as both a fire retardant and insulator. Surprisingly, an additive has been discovered and produced that meets all of these goals and desirable attributes. This additive will be disclosed herein.

SUMMARY OF THE SUBJECT MATTER

Flame-retarding additives that may also have insulating properties are disclosed that include at least one carbonate salt, and at least one additional salt, active ingredient or combination thereof.

In addition, methods of forming flame-retarding additives are disclosed that include providing at least one carbonate salt, providing at least one additional salt, active ingredient or combination thereof; and combining the at least one carbonate salt along with the at least one additional salt, active ingredient or combination thereof to form the flame-retarding additive.

Flame-retarding additives disclosed may also comprise at least one filler material, including sand or white sand.

These additives may also be included in paints and a number of processed building materials.

DETAILED DESCRIPTION

Flame-retarding additives that may also have insulating properties are disclosed that include at least one carbonate salt, and at least one additional salt, active ingredient or combination thereof. In addition, methods of forming flame-retarding additives are disclosed and shown in the Examples Section that include providing at least one carbonate salt, providing at least one additional salt, active ingredient or combination thereof; and combining the at least one carbonate salt along with the at least one additional salt, active ingredient or combination thereof to form the flame-retarding additive. Flame-retarding additives disclosed may also comprise at least one filler material, including sand or white sand. These additives may also be included in paints and a number of processed building materials.

In some embodiments, the at least one carbonate salt may comprise sodium bicarbonate or "baking soda". The at least one additional salt may comprise sulfates, such as aluminum sulfate or potassium sulfate, aluminum ammonium sulfate; borates such as sodium borate or NEOBOR (borax pentahydrate), phosphates, such as sodium polyphosphate or a combination thereof. In some embodiments, the at least one additional salt or material comprises alumina trihydrate, hydrotalcite, as well as other endothermic and/or non-endothermic substances. Some known endothermic materials (fire retardants) that can be used include synthetic or natural zeolites, other alumina hydrates such as alumina monohydrate, aluminum hydroxide ($Al(OH)_3$), aluminum nitrate ($Al(NO_3)_3 \cdot 9H_2O$), ammonium alum ($Al_2(SO_4)_3(NH_4)_2SO_4 \cdot 24H_2O$), potassium alum or kalimite ($Al_2(SO_4)_3K_2SO_4 \cdot 24H_2O$), and other inorganic hydroxides such as barium chloride, barium peroxide, borax or sodium tetraborate decahydrate, calcium borate, calcium sulfate, calcium sulfite), calcium phosphate, magnesium pyrophosphate, magnesium ammonium chloride, magnesium carbonate or nesquehonite, sodium diboric phosphate, sodium tribasec phosphate, sodium meta silicate, sodium sulfate, sodium carbonate or soda ash, zinc nitrate or a combination thereof to name a few.

The at least one filler material may comprise any suitable and inactive material, such as sand, white sand, composite materials, polymer materials, carbon-based materials and other flame/fire resistant, non-active filler materials.

In one embodiment, a contemplated fire-retardant and insulative additives comprise a) sodium borate, b) sodium bicarbonate and c) sand, such as white sand. Amazingly, the combination of these three simple components create a powerful additive that can be incorporated into or only any suitable building product or material. Sodium borate is commonly referred to as Borax, while sodium bicarbonate is commonly referred to as baking soda. One surprising result of the use of this additive is that along with the fire-resistant and insulative properties, the additive helps to resist attacks by insects, such as termites, as well as acting as a mold suppressor and/or inhibitor.

This additive can be incorporated into oil-based and water-based paints (both indoor and outdoor), stucco materials, insulation drywall, roof tiles, ceramic tiles, manufactured flooring, such as laminate tile or wood, and any other related building materials. This additive may be incorporated into or applied to glass. In addition, this additive can be incorporated into thin films that are applied to windows that are in current use. These thin films will enable a consumer to enjoy the benefits of the additive without replacing the windows in the home or building.

EXAMPLES

Example 1

Simple Flame-Retarding Additive

In one embodiment for providing an additive for a water-based primer sealer or an oil-based paint, the additive is produced by mixing sodium borate and sodium bicarbonate in a 50/50 mixture (50 parts or 50 weight percent sodium borate/50 parts or 50 weight percent sodium bicarbonate) and stirring for 10 minutes. The mixture can be added directly to the sealer or paint. Specifically, one can mix ½ cup borax with ½ cup baking soda.

Example 2

Flame-Retarding Additive with Filler

In another embodiment for providing an additive for building materials that shows insulative properties, the additive is produced by mixing a 40/40/20 mixture of white sand (40 parts or 40 weight percent), borax (40 parts or 40 weight percent) and baking soda (20 parts or 20 weight percent), respectively. These components are mixed for 10 minutes and then added to the building material, sealer or paint. The mixture is then mixed for 10 additional minutes. Specifically, one can mix ½ cup borax, ½ cup white sand and ¼ cup baking soda.

Example 3

Alternate Production of Flame-Retarding Additive with Filler

In yet another embodiment, one can mix equal amounts of white sand and borax/neobor for about 20 minutes. In some embodiments, this mixture is heated during the mixing step. Then, an equal amount to the first two additives is added of baking soda and the mixture is mixed for another 20 minutes This mixture can then be added to or applied to any product for the purpose of providing fire retardant and insulative properties, along with being resistant to bugs, such as termites.

Example 4

Flame-Retarding Additive with Alternate Additional Salt

Another embodiment contemplates combining eight parts of baking soda with three parts of aluminum sulfate (or one of several other various sulfate products) and then mixing for 20 minutes. This mixture can be infused with most oil or water based paints or coatings.

Thus, specific embodiments and applications of fire-resistant and insulating additives for incorporation into various building materials, the methods of production of these additives and materials and their uses have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A paint or building material comprising a flame-retarding additive, wherein the additive consists essentially of comprising 40 weight percent sand, 40 weight percent sodium borate and 20 weight percent sodium bicarbonate.

2. The paint or building material of claim 1, wherein the building material comprises stucco materials, insulation, drywall, roof tiles, ceramic tiles, manufactured flooring or a combination thereof.

* * * * *